(12) United States Patent
Kluge et al.

(10) Patent No.: US 9,427,889 B2
(45) Date of Patent: Aug. 30, 2016

(54) PROCESS AND SYSTEM FOR COLOURING PLASTICS MOULDING COMPOSITIONS

(75) Inventors: Andreas Kluge, Obertshausen (DE); Simon Becht, Niddatal-Assenheim (DE); Thorsten Goldacker, Rossdorf (DE); Thomas Wick, Floersheim-Dalsheim (DE); Michael Jucys, Otzberg (DE); Ursula Golchert, Dieburg (DE); Klaus Schultes, Wiesbaden (DE)

(73) Assignee: Evonik Roehm GmbH, Darmstadt (DE)

( * ) Notice: Subject to any disclaimer, the term of this patent is extended or adjusted under 35 U.S.C. 154(b) by 1219 days.

(21) Appl. No.: 13/382,252

(22) PCT Filed: Aug. 20, 2010

(86) PCT No.: PCT/EP2010/062156
§ 371 (c)(1),
(2), (4) Date: Jan. 4, 2012

(87) PCT Pub. No.: WO2011/038990
PCT Pub. Date: Apr. 7, 2011

(65) Prior Publication Data
US 2012/0108735 A1 May 3, 2012

(30) Foreign Application Priority Data
Sep. 29, 2009 (DE) .................. 10 2009 045 122

(51) Int. Cl.
B29B 7/38 (2006.01)
B29B 7/84 (2006.01)
(Continued)

(52) U.S. Cl.
CPC .............. *B29B 7/38* (2013.01); *B29B 7/845* (2013.01); *B29B 7/94* (2013.01); *B29C 47/1009* (2013.01); *B29C 47/1063* (2013.01); *B29C 47/1081* (2013.01); *B29C 47/385* (2013.01); *B29C 47/6056* (2013.01); *B29C 47/92* (2013.01); *B29C 2947/924* (2013.01); *B29C 2947/926* (2013.01);
(Continued)

(58) Field of Classification Search
CPC ......... B29B 7/847; B29B 7/845; B29B 7/94; B29B 7/38; B29C 47/1081; B29C 47/1063
See application file for complete search history.

(56) References Cited

U.S. PATENT DOCUMENTS 3,754,734 A 8/1973 Hoyle et al.
3,917,507 A 11/1975 Skidmore
(Continued)

FOREIGN PATENT DOCUMENTS

CH 353340 4/1961
DE 24 17 792 10/1975
(Continued)

OTHER PUBLICATIONS

U.S. Appl. No. 13/806,322, filed Dec. 21, 2012, Schwarz-Barac, et al.
(Continued)

*Primary Examiner* — Peter D Mulcahy
(74) *Attorney, Agent, or Firm* — Oblon, McClelland, Maier & Neustadt, L.L.P.

(57) ABSTRACT

The present invention relates to a process for producing colored plastics molding compositions with aqueous liquid colors, where an aqueous liquid color is added to a molten plastics molding composition.
The present invention also describes a system for conducting the said process.

16 Claims, 1 Drawing Sheet

(51) Int. Cl.
  *B29B 7/94* (2006.01)
  *B29C 47/38* (2006.01)
  *B29C 47/60* (2006.01)
  *B29C 47/92* (2006.01)
  *B29C 47/10* (2006.01)

(52) U.S. Cl.
  CPC ............ *B29C 2947/92019* (2013.01); *B29C 2947/92104* (2013.01); *B29C 2947/92209* (2013.01); *B29C 2947/92333* (2013.01); *B29C 2947/92466* (2013.01); *B29C 2947/92514* (2013.01); *B29C 2947/92704* (2013.01); *B29C 2947/92828* (2013.01); *B29C 2947/92866* (2013.01); *B29C 2947/92895* (2013.01); *B29C 2947/92961* (2013.01)

(56) References Cited

U.S. PATENT DOCUMENTS

| | | |
|---|---|---|
| 5,236,645 A | 8/1993 | Jones |
| 5,332,649 A | 7/1994 | Bleckmann et al. |
| 6,149,850 A | 11/2000 | Gannon |
| 6,649,122 B1 | 11/2003 | Lough et al. |
| 2006/0052515 A1 | 3/2006 | Schultes et al. |
| 2006/0264553 A1 | 11/2006 | Karger-Kocsis |
| 2007/0140045 A1 | 6/2007 | Becht et al. |
| 2007/0246867 A1 | 10/2007 | Nelson et al. |
| 2009/0176928 A1 | 7/2009 | Schultes et al. |
| 2011/0136964 A1 | 6/2011 | Golchert et al. |
| 2011/0218291 A1 | 9/2011 | Schultes et al. |

FOREIGN PATENT DOCUMENTS

| | | |
|---|---|---|
| DE | 10 2008 009 735 | 8/2009 |
| EP | 41 42 576 | 6/1993 |
| EP | 0 603 605 | 6/1994 |
| EP | 0 691 351 | 1/1996 |
| EP | 1 847 373 | 10/2007 |
| EP | 2 255 947 A1 | 12/2010 |
| JP | 2-196561 | 8/1990 |
| JP | 5-169515 | 7/1993 |
| JP | 7-78971 | 3/1995 |
| JP | 2001-179808 A | 7/2001 |
| JP | 2007-508961 | 4/2007 |
| WO | 2005 040254 | 5/2005 |
| WO | 2009 037118 | 3/2009 |
| WO | WO 2009/040189 A1 | 4/2009 |

OTHER PUBLICATIONS

U.S. Appl. No. 13/824,624, filed Mar. 18, 2013, Khrenov, et al.
International Search Report Issued Jan. 11, 2011 in PCT/EP10/62156 Filed Aug. 20, 2010.
Office Action issued Aug. 4, 2014 in Japanese Patent Application No. 2012-531300 (English translation only).
Combined Chinese Office Action and Search Report issued Jul. 10, 2014 in Patent Application No. 201080033227.6 (with English language translation).
Office Action issued Dec. 1, 2014 in European Patent Application No. 10 744 596.7.
Final Notification of Reasons for Refusal issued May 11, 2015 in Japanese Patent Application No. 2012-531300 (English translation).

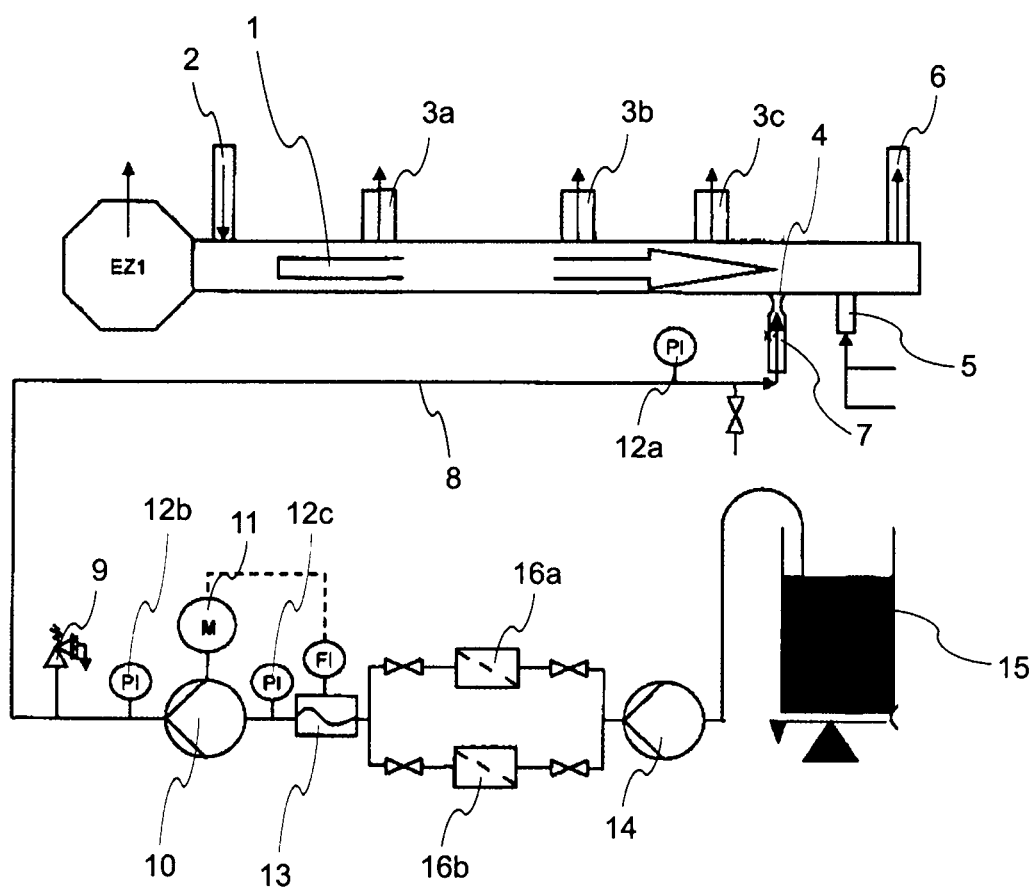

PROCESS AND SYSTEM FOR COLOURING PLASTICS MOULDING COMPOSITIONS

This application is a National Stage of PCT/EP10/062156 filed Aug. 20, 2010 and claims the benefit of DE 10 2009 045 122.6 filed Sep. 29, 2009.

The present invention relates to a process for producing coloured plastics moulding compositions. The present invention also describes a system for conducting the said process.

Colorants have a long history of use for colouring plastics moulding compositions. There are various usual processes used for this purpose, with various respective advantages and disadvantages.

By way of example, solid colorants can be added to the plastic that requires colouring. However, a disadvantage here is that it is very difficult to disperse the said pigments in the plastic, unless the plastic is subjected to a long period of compounding, but this can lead to degradation of the polymers and of the attendant mechanical properties of the same.

Accordingly, precoloured plastics are often used, and are known as masterbatches, comprising the required colorants, in particular pigments, in a concentrated form. However, the carrier polymers required can cause degradation of the mechanical properties of the plastics that require colouring here. Furthermore, it is often relatively expensive to use these precoloured plastics, since production of the same requires a long compounding process in order to achieve uniform dispersion of the colorant.

Organic solvents can also be used to achieve good dispersion of the colorants in the plastic that requires colouring. However, relatively large amounts of the said organic solvents remain in the coloured plastic. This often has an adverse effect on the mechanical properties of the plastics. By way of example, notched impact resistance is particularly reduced. Furthermore, susceptibility to stress cracking increases, where the mouldings obtainable from the moulding composition come into contact with organic solvents. Residues of organic solvents in moulding compositions can moreover lead to formation of deposits during further processing, for example by injection moulding.

For the abovementioned reasons, attempts have been made to use water-based colorants.

By way of example, publication U.S. Pat. No. 6,649,122 describes a water-based liquid colour which comprises from about 10 to about 80% of colorant, up to 30% of dispersing agent and from 25 to 90% of water. For the colouring of plastics pellets, the surface of the same is preferably wetted with the water-based liquid colour described, and then the water present in the colorant is removed. It is therefore preferable that the plastics pellets are pretreated with the colorant, whereupon the water is removed, before the plastics pellets to which colorant has been admixed are charged to the extruder, although Example 2 of the said publication says that the mixture obtained can also be charged to the feed section of the extruder without the premixing step described above. However, a foamed extrudate is often obtained from this process according to the said publication. Accordingly, the said publication advises against direct addition of the water-based liquid colour to the extruder.

A particular disadvantage of the procedure described as preferred in the document U.S. Pat. No. 6,649,122 is the energy cost associated with the premixing process. There is moreover an increased capital expenditure requirement for conducting this process, which is described as preferred. Furthermore, in both variants described above the extruder becomes completely wetted with colorant. This leads to high cost in the event of a colour change. In this context, reference may be made to the scrap that results from the large amount of plastics moulding composition with out-of-specification colour, in the event that changeover of the system is undertaken without dismantling the extruder. If the system is dismantled for cleaning, no coloured plastics moulding composition can be produced during that period. Another factor that has to be considered alongside the cost of dismantling is therefore the loss of production.

In the light of the prior art, it was then an object of the present invention to provide a process which can produce coloured plastics moulding compositions and with which it is possible to obtain coloured plastics moulding compositions at particularly low cost. The process should in particular permit particularly rapid and simple colour changes, without any need to dismantle the system and without production of any large amount of scrap.

Another object of the present invention was to provide processes which can produce coloured moulding compositions and which lead to plastics of high quality. The plastics here should have excellent mechanical properties, in particular high notched impact resistance or high Vicat softening point. The amount of polymer degradation associated with the colouring process should moreover be minimized. The coloured plastics should also exhibit very uniform colour, while the reproducibility of the colouring should be maximized. The coloured plastics moulding compositions should moreover have no susceptibility to formation of deposits during processing, in particular during injection moulding.

Another object of the invention consisted in providing a system which can conduct the present process and which provides high product quality with minimum variation. The system should moreover be capable of operation over a long period without any need for complicated maintenance operations.

It should moreover be possible to conduct the process in a simple and inexpensive manner, without any resultant risk to the environment.

A process with all of the features of patent claim 1 achieves these objects, and also achieves other objects which, although not explicitly mentioned, are readily derivable or deducible from the circumstances discussed in the introduction above. Advantageous embodiments of the process according to the invention are protected by the claims dependent on claim 1. Claim 15 provides a solution of the underlying object in respect of a system for conducting the process.

The present invention accordingly provides a process for producing coloured plastics moulding compositions with aqueous liquid colours, which is characterized in that an aqueous liquid colour is added to a molten plastics moulding composition.

It is thus possible, in a manner that was not foreseeable, to provide a process which can produce coloured plastics moulding compositions and which gives coloured plastics moulding compositions at particularly low cost. In particular, the process permits particularly rapid and simple colour changes, without any need to dismantle the system and without production of any large amount of scrap.

The process according to the invention moreover leads to production of coloured plastics of high quality. The plastics here exhibit by way of example excellent mechanical properties, visible in particular with a high notched impact resistance or high Vicat softening point. Surprisingly, the process according to the invention is successful in producing coloured plastics without any significant attendant degradation of the polymers. The coloured plastics moreover have a very uniform colour, the reproducibility of colouring being very high. The coloured plastics moulding compositions also exhibit extremely little susceptibility to formation of deposits during further processing, in particular during injection moulding.

The process can moreover be conducted in a simple and inexpensive manner, without any attendant risk to the environment.

The present invention also provides a system which can conduct the process and which provides surprisingly constant, high product quality. The system can moreover be operated over a long period without any need for complicated maintenance operations.

Moulding compositions which can be coloured according to the present process are known per se, and the said moulding compositions comprise, as obligatory component, thermoplastically processible polymers. Among the preferred polymers are by way of example poly(meth)acrylates, in particular polymethyl methacrylate (PMMA), poly(meth)acrylimides, polyacrylonitriles, polystyrenes, polyethers, polyesters, polycarbonates, polyvinyl chlorides. Preference is given here to poly(meth)acrylates and poly(meth)acrylimides. These polymers can be used individually or else in the form of a mixture. The said polymers can moreover also take the form of copolymers. Preferred copolymers are inter alia styrene-acrylonitrile copolymers, styrene-maleic copolymers and polymethyl methacrylate copolymers, in particular polymethyl methacrylate-poly(meth)acrylimide copolymers.

According to one particular aspect of the present invention, it is possible to colour moulding compositions which comprise polycarbonates. Polycarbonates are known to persons skilled in the art. Polycarbonates can formally be regarded as polyesters derived from carbonic acid and from aliphatic or aromatic dihydroxy compounds. They are readily accessible by using reaction of diglycols or bisphenols with phosgene or, respectively, carbonic diesters, by using polycondensation reactions or, respectively, transesterification reactions.

Preference is given here to polycarbonates which derive from bisphenols. Among these bisphenols are in particular 2,2-bis(4-hydroxyphenyl)propane (bisphenol A), 2,2-bis(4-hydroxyphenyl)butane (bisphenol B), 1,1-bis(4-hydroxyphenyl)cyclohexane (bisphenol C), 2,2'-methylenediphenol (bisphenol F), 2,2-bis(3,5-dibromo-4-hydroxyphenyl)propane(tetrabromobisphenol A) and 2,2-bis(3,5-dimethyl-4-hydroxyphenyl)propane (tetramethylbisphenol A).

It is usual to produce these aromatic polycarbonates by using interfacial polycondensation or transesterification, and relevant details are given in Encycl. Polym. Sci. Engng. 11, 648-718.

According to one particular embodiment of the present invention, it is possible to colour moulding compositions which comprise at least 20% by weight, preferably at least 40% by weight and very particularly preferably at least 80% by weight, of polycarbonates.

According to another embodiment of the present invention, particularly preferred moulding compositions comprise at least 15% by weight, preferably at least 50% by weight and particularly preferably at least 80% by weight, of polymethyl methacrylate, polymethacrylimide and/or polymethyl methacrylate copolymers, based on the total weight of the moulding composition.

The moulding compositions that can be coloured according to the present invention can preferably comprise poly (meth)acrylates. The term (meth)acrylates encompasses methacrylates and acrylates, and also mixtures of the two.

Poly(meth)acrylates are polymers obtainable by polymerization of a monomer mixture which has at least 60% by weight, preferably at least 80% by weight, of (meth)acrylates, based on the weight of the monomers. These monomers are well known to persons skilled in the art and are available commercially.

Among these are, inter alia, (meth)acrylic acid and (meth) acrylates which derive from saturated alcohols, e.g. methyl (meth)acrylate, ethyl(meth)acrylate, propyl(meth)acrylate, butyl(meth)acrylate, pentyl(meth)acrylate, hexyl(meth) acrylate, 2-ethylhexyl(meth)acrylate, heptyl(meth)acrylate; (meth)acrylates which derive from unsaturated alcohols, e.g. oleyl(meth)acrylate, 2-propynyl(meth)acrylate, allyl(meth) acrylate, vinyl(meth)acrylate, etc.; amides and nitriles of (meth)acrylic acid, e.g. N-(3-dimethylaminopropyl)(meth) acrylamide, N-(diethylphosphono)(meth)acrylamide, 1-methacryloylamido-2-methyl-2-propanol; cycloalkyl (meth)acrylates, such as 3-vinylcyclohexyl(meth)acrylate, bornyl(meth)acrylate; hydroxyalkyl(meth)acrylates, such as 3-hydroxypropyl(meth)acrylate, 3,4-dihydroxybutyl(meth) acrylate, 2-hydroxyethyl(meth)acrylate, 2-hydroxypropyl (meth)acrylate; glycol di(meth)acrylates, such as 1,4-butanediol (meth)acrylate, (meth)acrylates of ether alcohols, e.g. tetrahydrofurfuryl(meth)acrylate, vinyloxyethoxyethyl (meth)acrylate; and polyfunctional (meth)acrylates, such as trimethylolpropane tri(meth)acrylate.

Production of the poly(meth)acrylates can also use, alongside the (meth)acrylates described above, other unsaturated monomers copolymerizable with the abovementioned methacrylates. The amount generally used of these compounds, based on the weight of the monomers, is from 0 to 40% by weight, preferably from 0 to 20% by weight, and the comonomers here can be used individually or in the form of a mixture.

Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene;

vinyl esters, such as vinyl acetate;

styrene monomers, such as styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazol, 2-methyl-1-vinylimidazol, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene.

Preferred poly(meth)acrylates are obtainable by polymerization of mixtures which have at least 20% by weight, in particular at least 60% by weight and particularly preferably at least 80% by weight of methyl methacrylate, in each case based on the total weight of the monomers to be polymerized. For the purposes of the present invention, these polymers are termed polymethyl methacrylates. Preferred moulding compositions can comprise various poly(meth)acrylates which differ from one another by way of example in molecular weight or in monomer constitution.

Production of the (meth)acrylate homo- and/or copolymers from the monomers described above by the various processes of free-radical polymerization is known per se. For example, the polymers can be produced by bulk polymerization, solution polymerization, suspension polymerization or emulsion polymerization. Bulk polymerization is described by way of example in Houben-Weyl, Volume E20, Part 2 (1987), pp. 1145 et seq. Useful information with regard to solution polymerization is found on page 1156 et seq. in the same reference. Explanations of suspension polymerization technology are likewise found on page 1149 et seq. of the same reference, while emulsion polymerization is described and explained on page 1150 et seq. of the same reference.

Preferred moulding compositions can moreover comprise poly(meth)acrylimides. Poly(meth)acrylimides have repeat units which can be represented by formula (I)

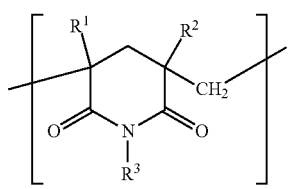

in which $R^1$ and $R^2$ are identical or different and are hydrogen or a methyl group, and $R^3$ is hydrogen or an alkyl or aryl moiety having up to 20 carbon atoms.

It is preferable that units of the structure (I) form more than 30% by weight, particularly preferably more than 50% by weight and very particularly preferably more than 80% by weight, of the poly(meth)acrylimide.

Production of poly(meth)acrylimides is known per se and described by way of example in GB Patent 1 078 425, GB Patent 1 045 229, DE Patent 1 817 156 (=U.S. Pat. No. 3,627,711) or DE Patent 27 26 259 (=U.S. Pat. No. 4,139, 685).

These copolymers can moreover contain further monomer units which derive by way of example from esters of acrylic or methacrylic acid, in particular with lower alcohols having from 1 to 4 carbon atoms, styrene, maleic acid or its anhydride, itaconic acid or its anhydride, vinylpyrrolidone, vinyl chloride or vinylidene chloride. The proportion of the comonomers which cannot be cyclized or which are very difficult to cyclize is intended to be no more than 30% by weight, preferably no more than 20% by weight and particularly preferably no more than 10% by weight, based on the weight of the monomers.

Moulding compositions that can be used are preferably those which encompass poly(N-methylmethacrylimides) (PMMI) and/or comprise polymethyl methacrylates (PMMA). Poly(N-methylmethacrylimides) (PMMI), polymethyl methacrylates (PMMA) and/or PMMI-PMMA copolymers are preferably copolymers of PMMI and PMMA which are produced by to some extent cycloimidizing the PMMA. (PMMI produced by partial imidization of PMMA is usually produced in such a way that at most 83% of the PMMA used are imidized. The resultant product is termed PMMI, but strictly is a PMMI-PMMA copolymer.) PMMA, and also PMMI or PMMI-PMMA copolymers, are commercially available, e.g. with the trade mark PLEXIGLAS or PLEXIMID from Evonik Röhm. An example of a copolymer (Pleximid 8803) has 33% of MMI units, 54.4% of MMA units, 2.6% of methacrylic acid units and 1.2% of anhydride units. The products are known, as also is their production (Hans R. Kricheldorf, Handbook of Polymer Synthesis, Part A, Verlag Marcel Dekker Inc. New York—Basle—Hongkong, pp. 223 et seq.; H. G. Elias, Makromoleküle [Macromolecules], Hüthig and Wepf Verlag Basle—Heidelberg—New York; U.S. Pat. Nos. 2,146,209, 4,246, 374).

The moulding compositions can moreover comprise styrene-acrylonitrile polymers (SAN). Particularly preferred styrene-acrylonitrile polymers can be obtained by polymerization of mixtures composed of from 70 to 92% by weight of styrene from 8 to 30% by weight of acrylonitrile and from 0 to 22% by weight of other comonomers, in each case based on the total weight of the monomers to be polymerized.

In order to improve impact resistance values, silicone rubber graft copolymers can be admixed with the moulding compositions and are composed of from 0.05 to 95% by weight, based on the total weight of the copolymer, of a core a) composed of an organosilicon polymer whose general formula is $(R_2SiO_{2/2})_x \cdot (RSiO_{3/2})_y \cdot (SiO_{4/2})_z$, where x=from 0 to 99.5 mol %, y=from 0.5 to 100 mol %, z=from 0 to 50 mol %, where R is identical or different alkyl or alkenyl radicals having from 1 to 6 carbon atoms, aryl radicals or substituted hydrocarbon moieties, from 0 to 94.5% by weight, based on the total weight of the copolymer, of a polydialkylsiloxane layer b) and from 5 to 95% by weight, based on the total weight of the copolymer, of a shell c) composed of organic polymers, the core a) comprises vinyl groups prior to the grafting process, and the shell c) is obtainable by free-radical polymerization of a mixture which comprises acrylic esters and methacrylates.

The moulding compositions according to the invention can moreover comprise acrylate rubber modifiers. Acrylate rubber modifiers of this type are known per se. These are copolymers which have a core-shell structure, where the core and the shell comprise a high proportion of the (meth) acrylates described above.

Preferred acrylate rubber modifiers here have a structure with two shells of different constitution.

Particularly preferred acrylate rubber modifiers have inter alia the following structure:
Core: Polymer having a proportion of at least 90% by weight of methyl methacrylate, based on the weight of the core.
Shell 1: Polymer having a proportion of at least 80% by weight of butyl acrylate, based on the weight of the first shell.

By way of example, a preferred acrylate rubber modifier can have the following structure:
Core: Copolymer composed of methyl methacrylate (95.7% by weight), ethyl acrylate (4% by weight) and allyl methacrylate (0.3% by weight)
S1: Copolymer composed of butyl acrylate (81.2% by weight), styrene (17.5% by weight) and allyl methacrylate (1.3% by weight)
S2: Copolymer composed of methyl methacrylate (96% by weight) and ethyl acrylate (4% by weight)

The ratio of core to shell(s) in the acrylate rubber modifiers can vary widely. The ratio by weight of core to shell C/S is preferably in the range from 20:80 to 80:20, with preference from 30:70 to 70:30 for modifiers with one shell, and the ratio of core to shell 1 to shell 2 C/S1/S2 is preferably in the range from 10:80:10 to 40:20:40, particularly preferably from 20:60:20 to 30:40:30 for modifiers having two shells.

The particle size of the acrylate rubber modifiers is usually in the range from 50 to 1000 nm, preferably from 100 to 500 nm and particularly preferably from 150 to 450 nm, with no intention of any resultant restriction.

Production of impact modifier has been described inter alia in EP-A 0 113 924, EP-A 0 522 351, EP 0 528 196 A1, EP-A 0 465 049 and EP-A 0 683 028. The impact modifiers described in the following publications: EP-A 0 113 924, submitted on 31 Dec. 1983 to the European Patent Office, with Application Number 83113259.2; EP-A 0 522 351, submitted on 26 Jun. 1991 to the European Patent Office, with Application Number 92110610.0; EP 0 528 196 A1, submitted on 22 Jul. 1992 to the European Patent Office, with Application Number 92112513.4; EP-A 0 465 049, submitted on 19 Jun. 1991 to the European Patent Office, with Application Number 91305555.4; and EP-A 0 683 028, submitted on 11 May 1995 to the European Patent Office, with Application Number 95107103.4; and processes for production of these, are incorporated into the present application for purposes of disclosure, by way of reference to the said publications.

According to one particular aspect of the present invention, the additives described above can be used in combination. Surprisingly, the combined use of the impact modifiers described above can give the mouldings produced from the moulding compositions excellent impact-resistance performance at room temperature (about 23° C.). Mechanical and thermal properties, such as modulus of elasticity or Vicat softening point, are thus retained at a very high level. If an attempt is made to achieve similar notched impact resistance performance at room temperature merely by using acrylate rubber modifier or silicone rubber graft copolymer, the result is a relatively marked reduction of the said values.

According to one particular aspect of the present invention, the ratio by weight of silicone rubber graft copolymer to acrylate rubber modifier can be in the range from 1:10 to 10:1, preferably from 4:6 to 6:4.

Particular moulding compositions are composed of
f1) from 20 to 95% by weight of poly(meth)acrylates,
f2) from 0 to 45% by weight of styrene-acrylonitrile polymers,
f3) from 5 to 60% by weight of silicone rubber graft copolymers,
f4) from 0 to 60% by weight of acrylate-rubber-based impact modifiers, based in each case on the weight of components f1 to f4,
and of conventional additives.

The compositions requiring polymerization, the moulding compositions that can be used according to the invention and, respectively, the mouldings obtainable therefrom can moreover comprise well-known additives. Among the said additives are inter alia chain-transfer agents, release agents, antistatic agents, antioxidants, mould-release agents, flame retardants, lubricants, colorants, flow improvers, fillers, light stabilizers, pigments, weathering stabilizers and plasticizers.

The amount used of the additives is conventional, i.e. up to 80% by weight, preferably up to 30% by weight, based on the entire composition. If the amount is greater than 80% by weight, based on the entire composition, properties of the plastics can be severely impaired, an example being the processibility thereof.

The weight-average molar mass $M_w$ of the homo- and/or copolymers to be used according to the invention in the plastics moulding compositions can vary widely, and the molar mass here is usually adjusted so as to be appropriate to the intended application and to the mode of processing of the moulding composition. However, it is generally from 20 000 to 1 000 000 g/mol, preferably from 50 000 to 500 000 g/mol and particularly preferably from 80 000 to 300 000 g/mol, without any intended resultant restriction. Molar mass can be determined by means of gel permeation chromatography (GPC) against a PMMA standard.

The modulus of elasticity of preferred moulding compositions and, respectively, mouldings produced therefrom is greater than or equal to 1200 MPa, preferably greater than or equal to 1600 MPa, to ISO 527 (at 1 mm/min). The Charpy impact resistance of moulding compositions coloured according to the invention and, respectively, mouldings produced therefrom can moreover be greater than or equal to 10 kJ/m$^2$, preferably greater than or equal to 15 kJ/m$^2$ to ISO 179.

It is moreover possible to produce plastics with tensile strengths greater than or equal to 55, preferably greater than or equal to 60, to DIN 53 455-1-3 (at 1 mm/min).

According to one particular aspect of the present invention, the moulding compositions described above can be advantageously obtained by using continuous polymerization processes. Processes of this type have been described inter alia in laid-open specification DE 44 24 300 A1. The processes described in publication DE 44 24 300 A1, submitted on 9 Jul. 1994 to the German Patent Office with Application Number P 44 24 300.6 for producing thermoplastic moulding compositions are incorporated into the present application for the purposes of disclosure by reference to the said publication. In the said processes, the polymers are produced or treated in an extruder. The aqueous liquid colour here can be passed into the extruder after the removal of residual monomers from the reaction mixture. Surprisingly, the process according to the invention accordingly permits colouring of plastics in a simple and inexpensive manner, without any requirement for repeated melting of the same. This method can moreover give plastics moulding compositions coloured at particularly low cost, since the production process and the colouring process can take place within an extruder. The returned monomer streams here comprise extremely small residues, and preferably no residues, of colorants, and a colour changeover can therefore take place without complicated cleaning procedures.

According to another aspect, the moulding compositions that can be used can advantageously be obtained by using solution polymerization processes. The expression "solution polymerization" is well known to persons skilled in the art, and processes of this type have been described in the prior art described above. The aqueous liquid colour can be added after the removal of solvent residues from the reaction mixture here.

An aqueous liquid colour is used to colour the moulding compositions described above. Aqueous liquid colours are means of colouring that comprise water. The said means of colouring can take the form of solution or dispersion, but it is preferable that aqueous liquid colours are provided by aqueous dispersions. The expression "liquid colour" means that the colorant is flowable under standard conditions (25° C. and 1013 mbar). The dynamic viscosity of preferred aqueous liquid colours is in the range from 0.5 to 2000 mPas, preferably from 10 to 1500 mPas and very particularly preferably from 100 to 600 mPas, measured to DIN EN ISO 2555 at 25° C. (Brookfield). The viscosity can easily be adjusted by way of the proportion of water and, if appropriate, the particle size of the colorant particles.

The proportion of water in the aqueous liquid colour is in the range from 5 to 95% by weight, preferably in the range from 20 to 80% by weight and particularly preferably in the range from 40 to 60% by weight.

Liquid colours of this type have been described inter alia in the publication U.S. Pat. No. 6,649,122 B1 described above, submitted to the US Patent Office (USPTO) with application Ser. No. 09/545,014 on 7 Apr. 2000, and the liquid colours described therein, and the production of the same, are incorporated into the present application for purposes of disclosure by reference to the said specification.

The said liquid colours usually comprise at least one colorant, alongside water. According to DIN 55943, colorant is the generic term for any substance that provides colour. Among the substances that provide colour are inter alia soluble colorants and inorganic or organic pigments. These colorants can be used individually or in the form of a mixture of two or more thereof. By way of example, it is particularly possible to use mixtures of organic colour pigments with dyestuff. It is moreover possible to use mixtures which comprise inorganic and organic colour pigments. It is also possible to use mixtures which comprise dyestuff in addition to the inorganic colour pigments. Other advantageous mixtures are those which comprise soluble colorants and inorganic and organic pigments. The colorants described above are described inter alia in Kirk Othmer Encyclopedia of Chemical Technology, Third Edition, vol. 19, pp. 1 to 78 and in Ullmann's Encyclopedia of Industrial Chemistry, $5^{th}$ Edition on CD-ROM.

Among the preferred organic colour pigments are inter alia azo and diazo colorants, phthalocyanines, perylenes, methines, and anthraquinones.

Examples of dyestuffs are inter alia anthrapyrimidines, quinophthalone, perinones or monoazo colorants, e.g. Thermoplastrot® 454, Thermoplast Black X70®, Macrolexgelb® G, Sandoplast® Red G or Solvaperm® Red G.

Preferred inorganic pigments are inter alia zinc chromate, cadmium sulphide, chromium oxide, ultramarine pigments and metal flakes, and also $BaSO_4$ and $TiO_2$, and also carbon black.

The amount of colorant can be from 0.1% by weight to 80% by weight, preferably from 0.5% by weight to 50% by weight and very particularly preferably in the range from 10% by weight to 40% by weight, based on the total weight of the aqueous liquid colour.

The ratio by weight of colorant to water can vary widely, but excessive proportions of colorants can lead to problems in the dispersion of the colorant within the plastics moulding composition, and in the conduct of the process, for example due to colour deposits in the valves. Excessively small proportions of colorants lead to excessive volumes in the supply line into the plastics moulding composition, and to a relatively large amount of water, which by way of example can be discharged from the extruder by way of the vent site. The ratio by weight of colorant to water is generally in the range from 50:1 to 1:50, preferably from 10:1 to 1:10 and very particularly preferably in the range from 5:1 to 1:5.

As a function of colorant, the aqueous liquid colour can comprise one or more dispersing agents, also termed surfactants. Among the preferred dispersing agents are inter alia polyvinylpyrrolidones, which by way of example are obtainable from BASF as Sokalan HP50; polyacrylates having ionic groups, and in particular here it is possible to use alkali metal salts of the said polyacrylate; lignosulphonates, which in particular can be used in the form of alkali metal salts or of iron salts; condensed naphthalenesulphonates, and naphthalenesulphonates which can preferably be used in the form of alkali metal salts.

Polyacrylates having ionic groups are polymers which comprise units derived from (meth)acrylic acid and/or from (meth)acrylates. The ionic groups present in the polyacrylates can be obtained by saponifying the ester groups or by using monomers having an acid group, preferably (meth)acrylic acid. These monomers have been described above, and reference is therefore made to the said disclosure.

Among the preferred dispersing agents are in particular nonionic surfactants, e.g. ethylene oxide/propylene oxide copolymers, preferably block copolymers, advantageously having from 8 to 40 ethylene oxide and, respectively, propylene oxide units, and polyacrylates having hydrophilic groups, in particular polyalkylene glycol groups.

The polyacrylates which have hydrophilic groups and are suitable as dispersing agents comprise units derived form (meth)acrylates. The expression "hydrophilic group" means that the said group brings about compatibility with water. Particular mention may be made here of nonionic groups which lead to hydrophilic properties. These groups derive in particular from monomers which are water-soluble or water-dispersible. Among these are in particular monomers having one or more hydroxy groups, particularly hydroxyalkyl (meth)acrylates, or having polyalkylene glycol groups.

Particularly preferred polyacrylates which are suitable as dispersing agents comprise units derived from polyalkylene glycol mono(meth)acrylates.

Polyalkylene glycol mono(meth)acrylates are monomers which have a polyalkylene glycol moiety in addition to a (meth)acrylate group. The production of the said monomers has been described inter alia in WO 2006/024538, submitted on 2 Feb. 2005 to the European Patent Office with Application Number PCT/EP2005/009466; and WO 2005/000929, submitted on 20 May 2004 to the US Patent Office (USPTO) with Application Number PCT/US2004/015898, and reference is made to the said publications for the purposes of disclosure, and the polyalkylene glycol mono(meth)acrylates described therein and processes for production thereof are incorporated into the present application. It is therefore possible to obtain polyalkylene glycol mono (meth)acrylates having a hydroxy group by reacting (meth) acrylic acid with epoxides. Polyalkylene glycol mono(meth) acrylates can also be obtained by transesterifying alkyl (meth)acrylates with alkoxypolyalkylene glycols, in particular methoxypoly-alkylene glycols.

The weight-average molar mass of the polyalkylene glycol mono(meth)acrylate is preferably in the range from 500 to 20 000 g/mol, particularly preferably in the range from 1000 to 10 000 g/mol, measured by GPC.

Among the preferred polyalkylene glycols for producing the polyalkylene glycol mono(meth)acrylates are in particular poly-$C_2$-$C_4$-alkylene glycol compounds. Poly-$C_2$-$C_4$-alkylene glycol compounds, which are also variously termed poly-$C_2$-$C_4$-alkylene oxides or poly(oxy-$C_2$-$C_4$-alkylene) compounds, are oligomeric or macromolecular polyethers having a plurality, generally at least 3, often at least 5, and in particular at least 10, and generally not more than 500, often not more than 400, e.g. from 10 to 300, and in particular from 10 to 200, repeat units derived from $C_2$-$C_4$-alkylene glycols. The said compounds can be linear or branched.

Preferred polyalkylene glycol mono(meth)acrylates can be described by using the general formula (II):

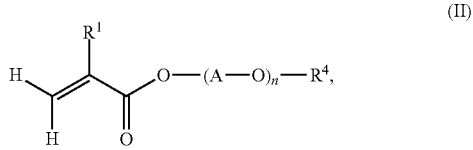

(II)

in which n gives the number of repeat units and is generally a number in the range from 3 to 500, in particular in the range from 5 to 400, particularly preferably in the range from 10 to 300 and very particularly preferably in the range from 10 to 200, A is $C_2$-$C_4$-alkylene, such as 1,2-ethanediyl, 1,3-propanediyl, 1,2-propanediyl, 1,2-butanediyl or 1,4-butanediyl; $R^1$ is hydrogen or methyl and $R^4$ is hydrogen or alkyl preferably having from 1 to 10 and in particular from 1 to 4 carbon atoms, phenyl, benzyl, acyl (=C(O)-alkyl) preferably having from 1 to 10 carbon atoms, $SO_3H$ groups or $PO_3H_2$, in particular $C_1$-$C_{10}$-alkyl and particularly preferably $C_1$-$C_4$-alkyl and specifically methyl or ethyl.

A particularly preferred feature of (poly-$C_2$-$C_4$-alkylene glycol) mono(meth)acrylates that can be used with particular preference is that at least 50% by weight, preferably at least 70% by weight, in particular at least 90% by weight and specifically all, of the repeat units A-O in formula (II) derive from ethylene glycol and, respectively, from ethylene oxide. Accordingly, it is preferable that at least 50% by weight, in particular at least 70% by weight, very particularly preferably at least 90% by weight, and specifically all, of the units A-O in formula (II) are $CH_2$—$CH_2$—O. According to another preferred embodiment of the present invention, at least 50% by weight, preferably at least 70% by weight, in particular at least 90% by weight, and specifically all, of the repeat units in the poly-$C_2$-$C_4$-alkylene glycol compound P used can derive from propylene glycol and, respectively, propylene oxide.

Among the preferred polyalkylene glycol mono(meth) acrylates are in particular alkoxypolyalkylene glycol mono (meth)acrylates which feature an alkoxy group as moiety R in above formula (II). Particular preference is given here to methoxypolyethylene glycol mono(meth)acrylates, also termed MPEG (meth)acrylates.

Surprising advantages can in particular be achieved by using polyacrylates which are suitable as dispersing agents and which have from 0.1 to 90% by weight, particularly preferably from 1 to 50% by weight and very particularly preferably from 5 to 30% by weight, of units which derive from polyalkylene glycol mono(meth)acrylates, based on the weight of the monomers used for producing the polyacrylates.

Preferred polyacrylates comprise, in addition to the polyalkylene glycol mono(meth)acrylate units described above, comonomers which can be used to achieve other desired properties, in particular high compatibility with the polymers present in the plastics moulding compositions that require colouring. Accordingly, the said polyacrylates can comprise units derived from styrene monomers from (meth) acrylates or from other comonomers.

The said polyacrylates can be produced by using free-radical polymerization processes, and particular mention may be made here of solution polymerization reactions, bulk polymerization reactions or emulsion polymerization reactions. These are described in Ullmann's Encyclopedia of Industrial Chemistry, Sixth Edition.

Polyacrylates having polyalkylene glycol groups can by way of example be obtained commercially as EFKA®-4550 from Ciba Specialty Chemicals. The polymer consists essentially of the following monomers: alpha-methylstyrene, 2-ethylhexyl acrylate and MPEG methacrylate.

The dispersing agent, preferably a polyacrylate modified with hydrophilic groups, can preferably be used in the form of an aqueous solution with active ingredient content of from 1 to 99% by weight, preferably from 20 to 80% by weight and very preferably from 48% by weight to 52% by weight.

The amount of dispersing agent, preferably of polyacrylate, can be from 1 to 90% by weight, preferably from 5% by weight to 50% by weight and particularly preferably from 5 to 30% by weight, based on the total weight of the aqueous liquid colour.

The ratio by weight of water to dispersing agent can preferably be in the range from 100:1 to 1:5, particularly preferably from 10:1 to 1:2 and very particularly preferably in the range from 8:1 to 2:1.

The ratio by weight of colorant to dispersing agent can preferably be in the range from 100:1 to 1:5, particularly preferably from 10:1 to 1:1 and very particularly preferably in the range from 5:1 to 2:1.

The polyacrylate described above, having hydrophilic groups, can be used as pH-independent dispersing agent for pigment deflocculation in aqueous coating systems and pigment concentrates.

A liquid colour that can be used according to the invention can by way of example be produced by mixing of the components and subsequent dispersion.

According to the present invention, an aqueous liquid colour is added to a molten plastics moulding composition. The expression "molten plastics moulding composition" designates a moulding composition present in thermoplastic condition. Accordingly, the temperature of the plastics moulding composition is such as to permit thermoplastic processing of the same. The precise temperature here depends on the plastic used, in particular on the nature and the molecular weight of the polymers. The temperature of the molten plastics moulding composition can preferably be in the range from 80° C. to 350° C., with preference from 160 to 330° C., with particular preference from 190 to 285° C.

The liquid colour can be introduced into the polymer melt in any apparatus suitable for this purpose, and among these are by way of example static mixers or extruders.

An extruder can be used with preference for conducting the process. The term "extruder" usually denotes a conveying device which uses the functional principle of screw-conveying to extrude solid to high-viscosity compositions from an aperture. Apparatuses of this type have been known for a long time and are described by way of example in Chris Rauwendaal: Polymer Extrusion, Hanser Publishers, Munich Vienna New York, 1986, ISBN 3-446-14196-0, USA: ISBN 0-02-947500-7.

By way of example, single-screw or twin-screw extruders can be used. The person skilled in the art possesses the general knowledge required here for the selection and appropriate adjustment of suitable extruder screws, in particular the geometries thereof, as a function of the appropriate process-technology requirements, e.g. intake, conveying, homogenizing, melting and compression.

The barrel temperatures set in the feed section of the screw extruder are preferably in the range from 50 to 350° C. By way of example the moulding compositions described above can be introduced in the form of pellets into the feed section. According to one particular aspect of the present invention, it is also possible to add a reaction mixture which comprises the polymers that require colouring. The said reaction mixtures usually comprise substantial proportions of monomers and/or solvents. Downstream of the feed section there can be zones in which the material is melted and homogenized, followed by a discharge section (die).

It is also possible to use devolatilization at atmospheric pressure, or with application of vacuum, to remove volatile content from the melt during or after the homogenization process. Here, the extruder can have one or more vent zones. One of the devolatilization processes here can preferably take place in the region of the homogenizing process or after the same.

According to one preferred embodiment, an aqueous liquid colour can be admixed with the plastics moulding composition after a vent zone. In the event that the extruder has a plurality of vent zones, the liquid colour can preferably be introduced after the final vent zone.

The liquid metering necessary for introducing the liquid colour into the plastics melt can preferably take place by way of a valve. Of particular interest are systems which comprise an injection valve which prevents the melt from being forced back into the colour-supply line. By way of example, the valve can have a variable annular gap which can be used to regulate the admission pressure in the colour-supply line. The pressure here can be maintained by using a pump provided in the supply line. The valve can moreover have been designed in the form of a pressure-retention valve. The design of the valve can preferably be such as to minimize dead volume. By way of example, this can be achieved by flush sealing of the tip of the valve against the inner wall of the extrusion barrel.

According to one particular aspect of the present invention, the colour-supply line can be designed so as to be coolable in particular in the region of the extruder, in order to prevent premature evaporation of the water present in the colour composition. By way of example, this can be achieved by using known cooling elements, e.g. heat exchangers or Peltier elements.

The amount of aqueous liquid colour added to the moulding composition can be regulated by way of the conveying rate of a first pump provided in the colour-supply line. By way of example, the said pump can have been designed as a gear pump or piston diaphragm pump. The conveying rate of the pump can preferably be regulated by way of a mass-flow meter, where the conveying rate of the pump is used to ensure that the measured amount is the intended amount. As a function of the design of the pump, the conveying rate of the same can by way of example be adjusted by way of the rotation rate at which the pump is operated. The pressure in the colour-supply line can be measured by a pressure sensor and adjusted by regulation of the pump or, as a function of embodiment, by variation of the valve aperture, for example of the annular gap.

Surprising advantages in the regulation of the amount of aqueous liquid colour added to the moulding composition can in particular be achieved by using a control circuit which measures the mass flow up- or downstream of the first pump. The mass flow can preferably be determined with a Coriolis mass-flow meter.

In respect of the precision with which the amount of aqueous liquid colour can be controlled, a further improvement can be achieved by using a second pump, which introduces the aqueous liquid colour to the region of suction of the first pump. By way of example, a diaphragm pump can be used for this purpose, and can preferably be operated by way of compressed air. Between the two pumps, there can preferably be one or more filters provided, which retain large colour particles. Particular advantages are achieved by using switchable filters, which ensure continuous operation during a filter change.

The design of the apparatuses and equipment for the conveying and metering of the mass flows, in particular those of the molten plastics moulding composition and of the liquid colour, is preferably such as to minimize variations of the said mass flows. It is preferable that the deviation of the mass flows from the average values is at most 10%, particularly at most 5%.

Further liquid additives can be added by way of one or more further separate liquid-metering systems to the moulding compositions that require processing. If desired, solid additives can be added in either dissolved or suspended form, or by way of an additional solids-metering apparatus, preferably located either in the input zone or in one of the zones subsequent to the input zone. There can be a screw-metering system attached laterally for the addition of solid additives.

Kneading blocks can optionally and preferably be used to homogenize the melt. Temperature profiles set in the melting and homogenization section are preferably in the range from 160 to 330° C., particularly preferably from 190 to 285° C. In the discharge section, the temperatures are preferably in the range from 220 to 300° C. For the setting of the heating zones of the extruder during conduct of the process according to the invention, it is particularly preferable to use a temperature profile that rises from the input zone to the die. The temperature profile used here varies as a function of the polymer used.

The maximum barrel temperatures in the homogenizing section of the extruder are therefore from 220 to 285° C. in the case of polymethyl methacrylate, and from 250 to 330° C. in the case of polymethacrylimide. The temperatures stated here are based on barrel temperatures and can be measured by means of a thermometer, e.g. FeCuNi Type L or type J, or a PT 100 thermometer, or an IR thermometer.

The extruder can comprise further internals, in order by way of example to improve homogenization after introduction of the aqueous liquid colour. Internals provided can inter alia be static mixers or homogenization zones after the feed site. However, extended zones cause increased scrap during colour changes.

According to one particular aspect of the present invention, the extruder can have, downstream of the feed site for the aqueous liquid colour, a melt filter which retains contaminants. Surprisingly, this type of melt filter has the effect of a static mixer. The mesh width of the filter insert can by way of example be from 5 to 300 µm, preferably, for example, from 10 to 150 µm.

It is possible to produce mouldings directly by the process according to the invention by using appropriate dies, e.g. flat dies, annular dies or profile dies. This method can be used to produce mouldings such as flat foils, sheets, or profiles, or other mouldings. Processes known to the persons skilled in the art are used to cool the mouldings after they have been discharged from the extruder die. It is preferable to produce pellets. The pellets produced can be further processed in downstream assemblies to give injection-moulded items and extruded products of various thickness.

One particularly preferred system for conducting the process according to the invention is moreover explained in more detail on the basis of the attached FIG. 1.

Without any intended resultant restriction, FIG. 1 is a diagram of a preferred system suitable for producing coloured plastics moulding compositions with aqueous liquid colours.

The system shown in FIG. 1 for the colouring of plastics moulding compositions comprises an extruder 1, into which, by way of a feed site 2, a polymer composition is introduced, which comprises monomer residues, from a continuously operated polymerization process. The said monomer residues can be removed from the extruder 1 by way of vent zones EZ1, 3a, 3b and 3c. In the present embodiment, the composition located in the extruder is devolatilized at various pressures, and the vent zone 3c here is operated under vacuum. After the vent zone 3c, the extruder 1 has a feed site 4 for an aqueous liquid colour. In the present extruder 1 there is a further supply line 5 provided, by way of which by way of example further additives can be introduced into the moulding composition, examples being stabilizers and/or mould-release agents. The melt is removed from the extruder here by way of a heated melt pipe 6, and is introduced by way of a screen changer (not shown) to a strand extruder (not shown).

The feed site 4 in the extruder barrel here has been designed in the form of a hole, with no screw thread, in the underside. The injection valve 7 is connected to the extruder by a metal block mounted on the barrel by use of a screw thread, in such a way that the tip of the valve forms a flush seal with the inner wall of the barrel. Metering can thus be achieved without any dead volume.

The injection valve 7 here comprises an annular gap, by way of which an aqueous liquid colour can be introduced into the extruder 1. The width of the annular gap can be adjusted in the present embodiment. The injection valve 7 has been connected to a supply line 8, by way of which the aqueous liquid colour is introduced to the injection valve 7. There is a safety valve 9 provided in the supply line 8. The pressure of the aqueous liquid colour in the supply line 8 is generated here by way of a first pump 10. In the present system, the amount of liquid colour can be controlled precisely by way of a regulation system. The regulation system detects the mass flow by way of a mass-flow meter 13 (which can have been installed into the line 8 on the suction side of the pump 10, or else, if the arrangement is sufficiently pressure-tight, on the pressure side of the pump 10), and regulates the rotation rate of the pump drive 11 in such a way as to maintain the prescribed amount to be metered. The metering pressure on the pressure side of the pump 10 is moreover detected by a pressure sensor 12b. In the event of deviation from particular prescribed pressures, the injection valve 7 is closed, or the rotation rate of the pump drive 11 is altered. The admission pressure on the suction side of the pump 10 is moreover detected by a pressure sensor 12c. It displays the pressure after the filter units 16a and, respectively, 16b. If the value is less than a prescribed value, the filter unit used has become blocked. Switchover to the other filter unit is then necessary, and the blocked filter unit must be replaced or cleaned. The present system moreover has a second pump 14, which conveys the aqueous liquid colour from a feed container 15 into the region of suction of the first pump 10.

The feed container can have an agitator, in order to avoid sedimentation. It is also possible to use two feed containers, operated alternately. The present system has the two switchable filter units 16a and 16b provided in the region between the second pump 14 and the flow meter 13.

According to one preferred embodiment of the process according to the invention, the aqueous liquid colour is introduced under pressure into the extruder. The pressure with which the aqueous liquid colour is fed into the extruder can preferably be in the range from 0.1 to 200 bar (gauge pressure), and can particularly preferably be in the range from 5 to 70 bar (gauge pressure) and can very particularly preferably be in the range from 10 to 50 bar (gauge pressure). The pressure can in particular be measured by a pressure sensor provided in the supply line for the liquid colour before the injection valve 7 and after the first pump.

Processes of particular interest are those in which the difference between the pressure prevailing in the extruder in the region of the feed site for the liquid colour and the pressure with which the liquid colour is introduced is in the range from 0.1 to 100 bar, particularly preferably in the range from 5 to 50 bar. The pressure in the extruder in the region of the feed site can be measured by a pressure sensor provided at the said site.

The pressure in the region of the feed site within the extruder can by way of example be in the range from 200 mbar to 10 bar, preferably in the range from 0.8 bar to 3 bar (absolute).

The temperature of the moulding composition at the feed site is preferably in the range from 180 to 330° C., particularly preferably in the range from 220 to 285° C. The temperature here is based on the temperature of the extruder barrel and can be measured by means of a thermometer, e.g. FeCuNi type L or type J, or a PT 100 thermometer or an IR thermometer.

Surprising advantages can in particular be achieved in that the values for the temperature and pressure at the feed site are such that the equilibrium state of water is gaseous. The said values are based on the pressure and the temperature within the extruder. The said measure can in particular achieve continuous operation of the system over an extremely long period.

According to the invention, a coloured moulding composition is produced by using an aqueous liquid colour to colour a plastics moulding composition. The ratio by weight of aqueous liquid colour to plastics moulding composition can vary widely. The ratio by weight of aqueous liquid colour to plastics moulding composition can preferably lie within the range from 10:100 to 0.001:100, particularly preferably from 2:100 to 0.01:100. This ratio is based on the weight of plastics moulding composition in the region of the feed site, and the said ratio can be derived from the mass flows.

Without any intended resultant restriction, examples will be used below to illustrate the present invention.

EXAMPLE 1

In a system according to FIG. 1, 216t of a polymer mixture which comprised 108t of PMMA polymer, and also unreacted monomer, were introduced into a single-screw extruder over a period of 6 days. The first three vent zones were operated at atmospheric pressure, and the fourth was operated at a pressure of 200 mbar (absolute). The monomers obtained from the vent zones were condensed and used for producing polymethyl methacrylate.

The injection valve used was a Phoenix 230 DN2, PN 400 injection valve with folding bellows. The pressure at the feed site within the extruder was approximately atmospheric pressure, the temperature being about 260° C. The amount of moulding composition flowing past the feed site was 750 kg per hour. 535 g per hour of aqueous liquid colour were introduced at the feed site, using a pressure of 20 bar. The aqueous liquid colour used comprised a composition which comprised 20% by weight of polyacrylate as dispersing agent (obtainable commercially from Ciba Specialty Chemicals with trademark EFKA® 4550), 39.33% by weight of deionized water, 0.6% by weight of antifoam (obtainable commercially from BYK Additives and Instruments with trademark Byk® 024; antifoam based on polysiloxanes), 31.74% by weight of Thermoplastrot® 454 and 8.26% by weight of Macrolexgelb® G and 0.07% by weight of preservative (Ebotec® MT 15).

The arrangement shown in FIG. 1 was used to control the introduction process, using a Lewa FCMk 1 high-pressure pump (pump 10) and an Almatec A 08 UTT diaphragm pump operated by compressed air (pump 14). The mesh width of the filters was 50 μm. Wika IS10 pressure sensors were used. The flow rate in line 8 was determined by an Endress+Hauser Promass 83F Coriolis flow meter.

The system was capable of problem-free continuous operation for a period of 6 days. The coloured moulding composition exhibited excellent colour dispersion, which remained within very tight colour specifications.

Colour was described by using the standard colorimetric system (DIN 5033, Part 3), with x and y coordinates, and light transmittance, using DIN 5033, Parts 4 and 7 for determination of the said values.

Conventional specifications for the coloured moulding composition provide X coordinates in the range from 0.6722 to 0.6764, a Y coordinate in the range from 0.3228 to 0.3265, and transmittance in the range from 25.2 to 27.2%.

Over the entire production time, about 110 specimens were taken at constant intervals. The maximum value for the X coordinate was about 0.6750, and the minimum value was about 0.6732. The maximum value for the Y coordinate was about 0.3254, and the minimum value was about 0.3238. The maximum value for transmittance was about 26.5%, and the minimum value was about 25.6%.

The values described indicate that it was possible not only to achieve compliance with the specification but also to achieve compliance with a substantially tighter tolerance. Accordingly, the present process can comply with very strict colour tolerances which conventional processes can rarely achieve.

The invention claimed is:

1. A process or producing a color plastic molding composition, the process comprising:
adding an aqueous solution comprising a colorant and water to a molten plastic molding composition in an extruder, wherein the extruder comprises one or more vent zones, and the aqueous solution is added after all of the one or more vent zones.

2. The process of claim 1, wherein the molten plastic molding composition comprises a poly(meth)acrylate.

3. The process of claim 1, a content of the colorant in the aqueous solution is from 0.5% to 50% by weight based on a total weight of the aqueous solution.

4. The process of claim 1, wherein the aqueous solution further comprises a dispersing agent at a content from 5% to 50% by weight based on a total weight of the aqueous solution.

5. The process of claim 4, wherein the dispersing agent is a polyacrylate comprising a hydrophilic or an ionic group.

6. The process of claim 4, wherein a ratio by weight % of water to the dispersing agent is in a range from 2:1 to 1:2.

7. The process of claim 1, wherein the adding is performed under pressure.

8. The process of claim 7, wherein a pressure of the aqueous solution is in a range from 0.1 to 200 bar.

9. The process of claim 7, wherein a difference between a first pressure at an aqueous solution feed site in the extruder and a second pressure of the aqueous solution is in a range from 0.1 to 100 bar.

10. The process of claim 9, wherein a temperature of the molten plastic molding composition at the aqueous solution feed site is in a range from 180 to 330° C.

11. The process of claim 10, wherein the temperature and the pressure at the aqueous solution feed site are such that an equilibrium state of water is gaseous.

12. The process of claim 1, wherein a ratio by weight of the aqueous solution to the molten plastic molding composition is in a range from 1:10 to 0.0001:10.

13. The process of claim 1, further comprising, prior to the adding:
continuously polymerizing a reaction mixture comprising monomers in an extruder, to obtain the molten plastic molding composition.

14. The process of claim 1, which is performed as a continuous process.

15. The process of claim 1, wherein the extruder comprises one vent zone and the aqueous solution is added after the one vent zone.

16. The process of claim 1, wherein the extruder comprises a plurality of vent zones and the aqueous solution is added after the last of the plurality of vent zones.

* * * * *